United States Patent
Lau et al.

(10) Patent No.: US 6,714,862 B1
(45) Date of Patent: Mar. 30, 2004

(54) NAVIGATION METHOD AND A NAVIGATION SYSTEM FOR DETERMINING A ROUTE FOR A MEANS OF TRANSPORT MOVING FROM STARTING POINT TO A DESTINATION

(75) Inventors: Stefan Lau, Giesen (DE); Heinrich Schmidt, Diekholzen (DE); Ralf Hoffmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/914,877

(22) PCT Filed: Feb. 22, 2000

(86) PCT No.: PCT/DE00/00488

§ 371 (c)(1),
(2), (4) Date: Sep. 4, 2001

(87) PCT Pub. No.: WO00/52423

PCT Pub. Date: Sep. 8, 2000

(30) Foreign Application Priority Data

Mar. 2, 1999 (DE) .......................... 199 08 941

(51) Int. Cl.⁷ ..................... G06F 15/50; G06F 165/00; G06G 7/78
(52) U.S. Cl. ................. 701/209; 701/200; 340/988
(58) Field of Search .......................... 701/209, 200, 701/201, 202, 208, 210, 211, 117, 207, 118, 25; 340/988, 990, 995.19, 995.22, 995.18; 73/178 R

(56) References Cited

U.S. PATENT DOCUMENTS

| | | | | |
|---|---|---|---|---|
| 5,272,638 A | * | 12/1993 | Martin et al. ............... | 364/444 |
| 5,285,391 A | * | 2/1994 | Smith, Jr. et al. ........... | 364/443 |
| 5,475,387 A | * | 12/1995 | Matsumoto ................. | 340/990 |
| 5,610,821 A | * | 3/1997 | Gazis et al. ............. | 364/444.2 |
| 5,877,708 A | * | 3/1999 | Hijikata ....................... | 340/995 |
| 5,878,368 A | * | 3/1999 | DeGraaf ..................... | 701/209 |
| 5,938,720 A | * | 8/1999 | Tamai ......................... | 701/209 |

FOREIGN PATENT DOCUMENTS

| | | |
|---|---|---|
| EP | 0 323 299 | 7/1989 |
| EP | 0 575 943 | 12/1993 |
| EP | 0 660 289 | 6/1995 |
| WO | WO 92 14215 | 8/1992 |

* cited by examiner

*Primary Examiner*—Tan Q. Nguyen
*Assistant Examiner*—Dalena Tran
(74) *Attorney, Agent, or Firm*—Kenyon & Kenyon

(57) ABSTRACT

A navigational method and a navigational system for determining a route from a starting location to a destination location for a means of locomotion, especially for a motor vehicle, an airplane, or a ship, the route being calculated on the basis of a digital database, which contains predetermined path segments $W_i$ having correspondingly assigned nodal points $N_i$, which connect the specific path segments $W_i$ to each other, the specific weightings $G_i$ being assigned to the path segments $W_i$ and/or to the nodal points $N_i$. In this context, the weightings $G_i$ that are used for the route calculation are varied as a function of the time of day.

7 Claims, 1 Drawing Sheet

Fig.
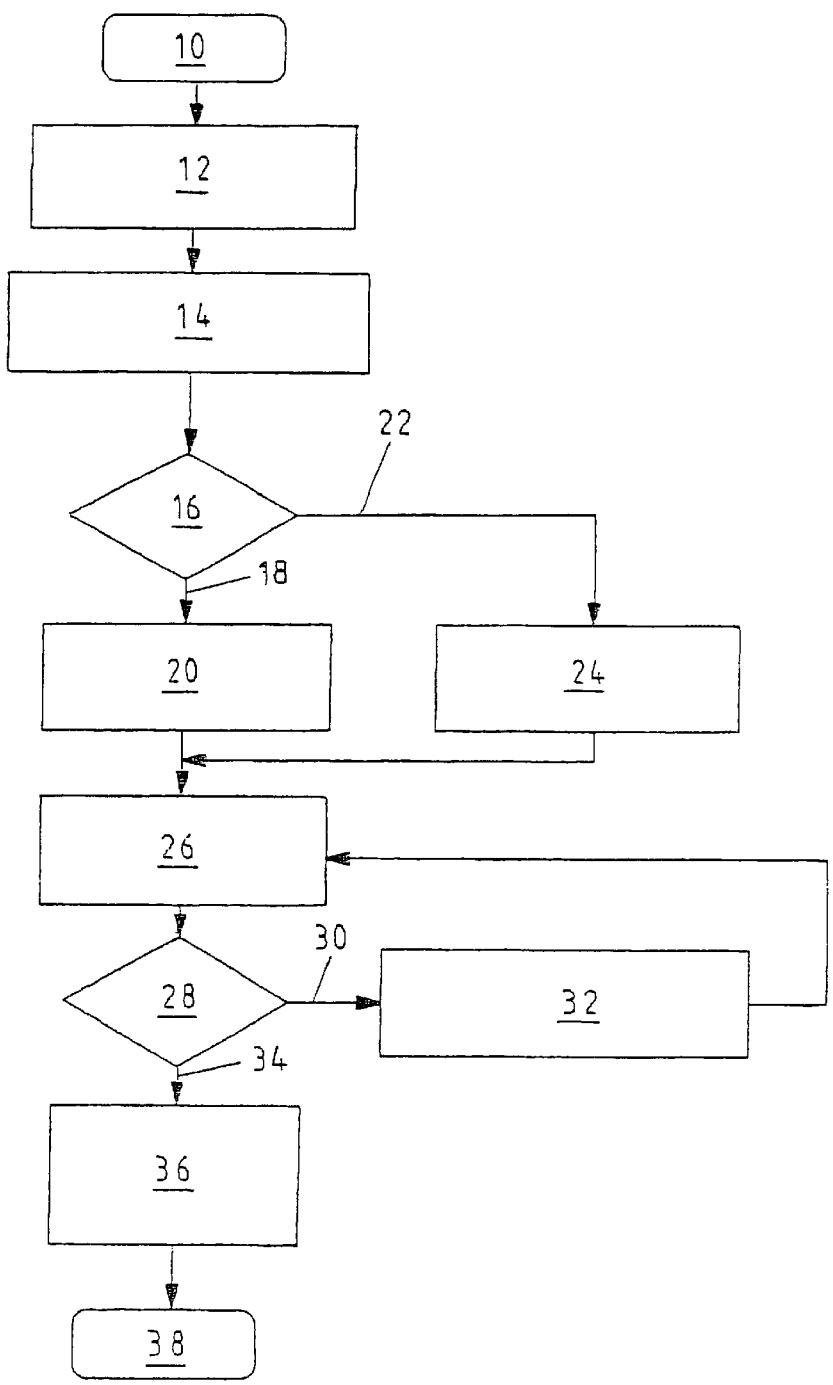

NAVIGATION METHOD AND A NAVIGATION SYSTEM FOR DETERMINING A ROUTE FOR A MEANS OF TRANSPORT MOVING FROM STARTING POINT TO A DESTINATION

FIELD OF THE INVENTION

The present invention relates to a navigational method for determining a route from a starting location to a destination location for a means of locomotion, especially for a motor vehicle, an airplane, or a ship, the route being calculated on the basis of a digital database, which includes predetermined path segments $W_i$ having correspondingly assigned nodal points $N_i$, which connect individual path segments $W_i$ to each other, specific weightings $G_i$ being assigned to path segments $W_i$ and/or nodal points $N_i$. The present invention also relates to a navigational system for determining a route from a starting location to a destination location for a means of locomotion, especially for a motor vehicle, an airplane, or a ship, a digital database being provided for calculating the route, the database including predetermined path segments $W_i$ having correspondingly assigned nodal points $N_1$, which connect individual path segments $W_i$ to each other, specific weightings $G_i$ being assigned to path segments $W_i$ and/or nodal points $N_i$.

BACKGROUND INFORMATION

Navigational systems, such as those that operate on the basis of GPS (Global Positioning System), support an operator of a means of locomotion in navigating to a predetermined destination. In this context, the navigational system determines an optimal path, i.e., an optimal route, at least on the basis of starting and destination coordinates and of a corresponding digital database, which is essentially an image of the real street network and is also designated as a digital map. Conventional navigational systems calculate a route between two points taking into account previously defined average speeds, which are stored permanently for each street type that is present in the digital map. In any case, just as with PC-based route search programs, individual direction values can be defined by the user for the street classes, but these direction values often do not rest on true average values but rather on the assumptions of the user. Recently, it has become possible to adjust these speeds on the basis of the instantaneous traffic situation, which is termed "dynamic navigation." However, these systems are cumbersome and expensive because they require a data connection from the navigational system to a telematic central office.

SUMMARY OF THE INVENTION

It is an object of the present invention to make available an improved navigational method of the type cited above as well as to make available an improved navigational system of the type cited above, which eliminate the aforementioned disadvantages. For this purpose, in a navigational method of the aforementioned type, it is provided in accordance with the present invention that weightings $G_i$ that are used for the route calculation are varied in accordance with the time of day.

This has the advantage that the weighting of a street that is represented in a digital map is no longer constant but is viewed, or determined, as a function of time. In this way, by taking account of the fluctuations in the traffic density according to the time of day, more realistic data can be achieved for a calculated, anticipated duration of driving. In addition, the calculated route is adjusted to a specific time of day, because at the main traffic times, the main traffic routes are more significantly affected by a reduction in possible average speed than subsidiary routes.

For example, for each path segment $W_i$ two weightings $G_i$ are used for two times of day, or weightings $G_i$ as a function of time t are determined as $G_i(t)$.

In one preferred embodiment, weightings $G_i$ are calculated from the product of $G_i = L_i * K_i$, $L_i$ being a length of path segment $W_i$, and $K_i$ being a path segment class that is proportional to the average speed that is possible on path segment $W_i$. To vary weightings $G_i$, path segment class $K_i$, which is assigned to this path segment $W_i$, is varied in accordance with the time of day.

A simple function for switching over between day and night conditions is achieved as a result of the fact that for each path segment $W_i$ two path segment classes $K_i$ for two times of day are used. This simple function has the advantage that the corresponding value only has to be calculated once before the beginning of the route calculation, and the route calculation then proceeds as if using a constant weighting. Alternatively, path segment class $K_i$ as a function of time t is determined as $K_i(t)$.

In a navigational system of the above-mentioned type, according to the present invention, variable weightings $G_i$ are provided as a function of the time of day.

Thus, for example, for each path segment $W_i$ two weightings $G_i$ for two times a day are provided, or a predetermined function of time t is provided, which varies the weightings $G_i$ as a function of time, yielding $G_i(t)$.

In one preferred embodiment, weightings $G_i$ correspond to the product of $G_i = L_i * K_i$, $L_i$ being a length of path segment $W_i$, and $K_i$ being a path segment class that is proportional to the average speed that is possible on path segment $W_i$. To vary weightings $G_i$, in this context, path segment classes $K_i$, which are assigned to this path segment $W_i$, are provided as a function of the time of day.

A simple function for switching over between day and night conditions is achieved as a result of the fact that for each path segment $W_i$ two path segment classes $K_i$ for two times of day are provided. This simple function has the advantage that the corresponding value only has to be calculated once before the beginning of the route calculation, and the route calculation then proceeds as if using a constant weighting. Alternatively, a predetermined function of time t is provided, which varies path segment class $K_i$ as a function of time, yielding $K_i(t)$.

BRIEF DESCRIPTION IF THE DRAWING

The FIGURE depicts a block diagram of a preferred embodiment of the navigational system according to the present invention.

DETAILED DESCRIPTION

The concrete realization of the present invention in a navigational system depends on the type of algorithm used for the route calculation. In the preferred embodiment of the present invention described below, it is assumed only by way of example that weighting $G_i$ of a path segment, or route section, $W_i$ is proportional to a path segment, or street class, $K_i$ and to a length $L_i$ of this path segment. Weighting $G_i$ of path segment $W_i$ is then determined by the product of $$G_i = L_i * K_i.$$

For the shortest segment, $K_i=1$ is assumed, and sum G is minimized. For the fastest segment, $K_i$ is inversely proportional to the speed that is possible on section, or path segment, $W_i$. For example, $K_i$ is measured in s/km (seconds per km). According to the present invention, two $K_i$ tables for two different times of day are then provided. The times a day are, for example, from 7:00 a.m. until 7:00 p.m. (day) and from 7:00 p.m. until 7:00 a.m. (night). In accordance with the instantaneous clock time, street class $K_i$ is then derived from a $K_i^{7am-7pm}$ table or from a $K_i^{7pm-7am}$ table. Alternatively, weighting $G_i$ is determined as a function of time t according to the formula $$G_i(t)=L_i * K_i(t).$$

The latter has the advantage that in a more powerful system, the main traffic times can also be taken into account as fluctuations in traffic density occurring in accordance with the time of day. The corresponding progress lines are known as average values for most streets, and they therefore function as the basis for a "universal" characteristic curve $K_i(t)$.

In the following description of one preferred embodiment of the present invention on the basis of the single FIGURE, the assumption is made of the first case, in which the times of day are divided into "day" and "night." At 10, the navigational system starts the navigational process, and at 12 an initialization takes place, in that a user inputs a destination point. The starting point is automatically determined at 14 as the instantaneous location, for example, using GPS (Global Positioning System, i.e., a satellite navigational system). In addition, the time of day is determined. In block 16, a check is carried out as to whether the time lies between 7:00 a.m. and 7:00 p.m. If it does, the process is continued through branch 18, and in 20 a route based on the day values of weightings $G_i(day)$ is calculated using street classes $K_i$ from the $K_i^{7am-7pm}$ table. If it does not, then the process is continued to branch 22, and in 24 a route based on the night values of weightings $G_i(night)$ is calculated using street classes $K_i$ from the $K_1^{7pm-7am}$ table. In block 26, the guidance system mode begins, in which the user is guided by optical and/or acoustical signals, or commands, along the calculated route.

In block 28, for example, each time a nodal point $N_i$ is reached between two path segments $W_i$ and $W_{i+1}$, a check is carried out as to whether the destination has been reached. If not, then the process is continued through branch 30, and in block 32 the instantaneous position is determined, for example using GPS, along with the street class and the time, and then once again guidance system mode 26 is executed. If the check in 28 yields a "yes," then the process continues through branch 34, and in 36 the user is informed that the destination location has been reached. In addition, the navigational mode is terminated. In block 38, finally, navigational method ends.

What is claimed is:

1. A navigational system for determining a route from a starting location to a destination location for a locomotion device, comprising:
   an arrangement for providing a digital map base for calculating the route, the digital map base including predetermined path segments $W_i$ having correspondingly assigned nodal points $N_i$ that connect the predetermined path segments $W_i$ to each other; and
   an arrangement for assigning specific weightings $G_i$ to at least one of the predetermined path segments $W_i$ and the nodal points $N_i$, wherein:
   the specific weightings $G_i$ vary as a function of a time of day, and
   the specific weightings $G_i$ correspond to a product of $G_i=L_i * K_i$, $L_i$ being a path segment length, and $K_i$ being a path segment class $K_i$ that is inversely proportional to an average speed that is possible on one of the predetermined path segments $W_i$.

2. The navigational system according to claim 1, wherein:
   the locomotion device includes one of a motor vehicle, an airplane, and a ship.

3. The navigational system according to claim 1, wherein:
   for each path segment $W_i$ two weightings $G_i$ for two times of day are used.

4. The navigational system according to claim 1, further comprising
   an arrangement for providing a predetermined function of a time t, the predetermined function varying the specific weightings $G_i$ as a function of time to yield $G_i(t)$.

5. The navigational system according to claim 4, further comprising:
   an arrangement for providing another predetermined function of the time t, the other predetermined function varying the path segment class $K_i$ as a function of time to yield $K_i(t)$.

6. The navigational system according to claim 1, further comprising
   an arrangement for, for varying the specific weightings $G_i$, providing the path segment class $K_i$ that is assigned to the corresponding predetermined path segment $W_i$ and that is a function of the time of day.

7. The navigational system according to claim 1, further comprising:
   an arrangement for providing two path segment classes $K_i$ for two times of day for each predetermined path segment $W_i$.

* * * * *